Figure 1A:
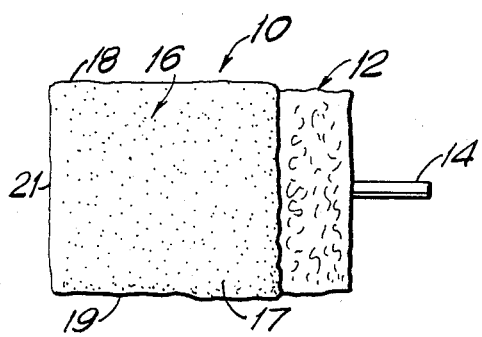

United States Patent [19]

Beck, Jr.

[11] Patent Number: 4,488,204
[45] Date of Patent: Dec. 11, 1984

[54] DEVICE FOR USE IN MAKING ENCAPSULATED CHIP CAPACITOR ASSEMBLIES

[75] Inventor: Raymond L. Beck, Jr., Simpsonville, S.C.

[73] Assignee: Union Carbide Corporation, Danbury, Conn.

[21] Appl. No.: 547,643

[22] Filed: Nov. 1, 1983

[51] Int. Cl.³ .............................................. H01G 9/00
[52] U.S. Cl. ..................................... 361/433; 29/570
[58] Field of Search .............. 361/306, 308, 309, 310, 361/433; 29/25.42, 570, 583, 588

[56] References Cited

U.S. PATENT DOCUMENTS

| | | | |
|---|---|---|---|
| 4,004,200 | 1/1977 | Johanson | 361/310 |
| 4,059,887 | 11/1977 | Galvagni | 29/570 |
| 4,085,435 | 4/1978 | Galvagni | 361/433 |
| 4,097,915 | 6/1978 | Locke | 361/433 |
| 4,166,286 | 8/1979 | Boissonnault | 361/433 |
| 4,173,062 | 11/1979 | Locke | 29/570 |
| 4,231,075 | 10/1980 | Morimoto et al. | 361/433 |
| 4,247,883 | 1/1981 | Thompson et al. | 361/433 |
| 4,282,645 | 8/1981 | Thompson et al. | 29/570 |
| 4,346,429 | 8/1982 | DeMatos | 361/310 |
| 4,349,860 | 9/1982 | Ohsawa | 361/310 |
| 4,417,298 | 11/1983 | Nakata et al. | 361/433 |

FOREIGN PATENT DOCUMENTS

| | | |
|---|---|---|
| 115324 | 9/1980 | Japan . |
| 138225 | 10/1980 | Japan . |
| 140222 | 11/1980 | Japan . |
| 153320 | 11/1980 | Japan . |
| 153361 | 11/1980 | Japan . |
| 2620 | 1/1981 | Japan . |
| 10917 | 2/1981 | Japan . |
| 160117 | 10/1982 | Japan . |
| 98912 | 6/1983 | Japan . |
| 101418 | 6/1983 | Japan . |
| 110027 | 6/1983 | Japan . |

*Primary Examiner*—Donald A. Griffin
*Attorney, Agent, or Firm*—Frederick J. McCarthy, Jr.

[57] ABSTRACT

A device for use in making encapsulated chip electrolytic capacitors of precise dimensions having planar surfaces and anode and cathode terminals formed from a metal channel containing the electrolyte capacitor.

4 Claims, 12 Drawing Figures

DEVICE FOR USE IN MAKING ENCAPSULATED CHIP CAPACITOR ASSEMBLIES

The present invention relates to encapsulated chip capacitors. More particularly, the present invention relates to a device for use in making an encapsulated solid tantalum electrolytic capacitor assembly which includes a metal channel and has planar surfaces of closely controlled dimensions and further has integral anode and cathode terminals formed from said metal channel which provide mounting and handling versatility particularly for surface mounting on printed circuit boards or hybrid substrates.

Encapsulated chip capacitor assemblies are well known in the art and a variety of the same have been disclosed in United States patents, for example, in U.S. Pat. Nos. 4,247,883 and 4,282,645—D. G. Thompson and J. T. Ogilvie and U.S. Pat. No. 4,059,887—J. L. Galvagni.

Notwithstanding the advances previously made in encapsulated chip capacitors, there remains the need to provide encapsulated chip capacitors having the combined properties of precise dimensional control, ruggedness, high volumetric capacitance efficiency, ease of construction and mass production, and ease and versatility of assembly in the mass production of printed circuit board assemblies and hybrid circuits.

It is accordingly an object of the present invention to provide a device for use in making an encapsulated chip capacitor having the above-noted combination of properties.

Figure 1B:
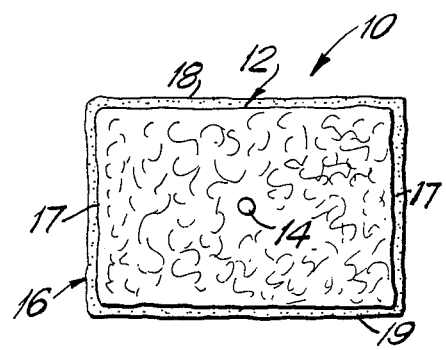
Figure 2A:
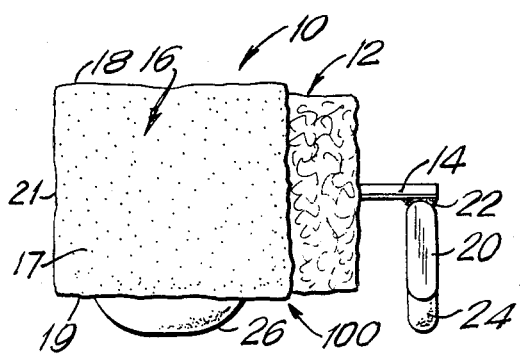
Figure 2B:
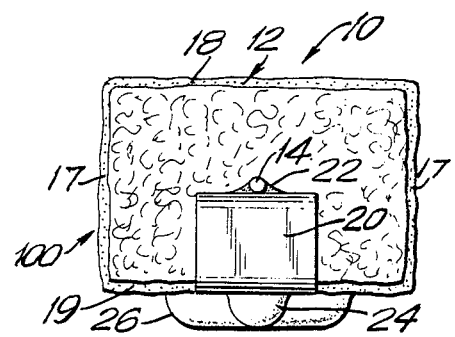
Figure 3:
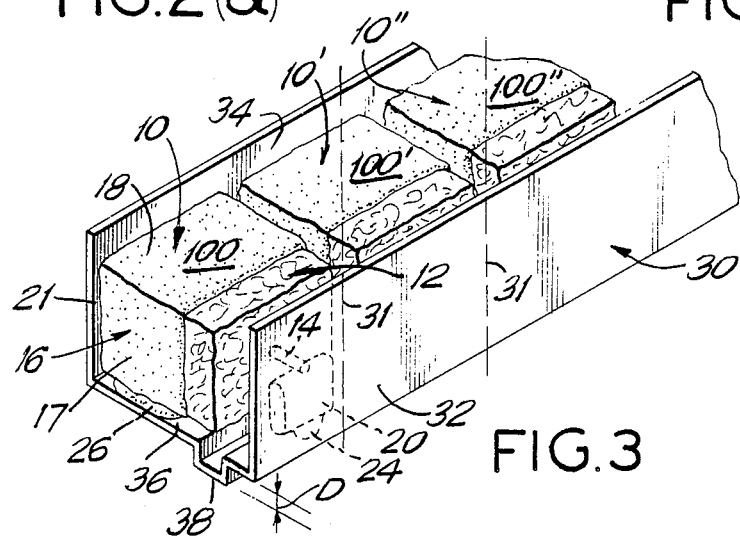
Figures 4A, 4B:
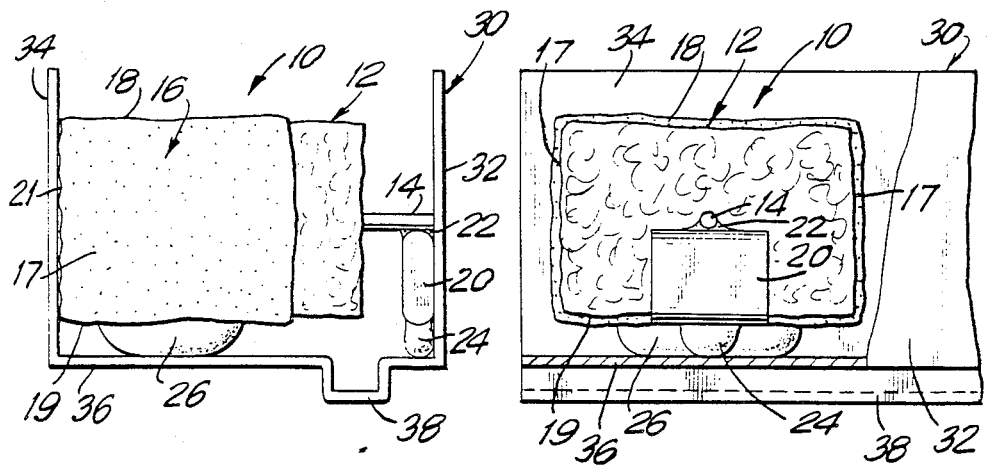
Figures 5A, 5B:
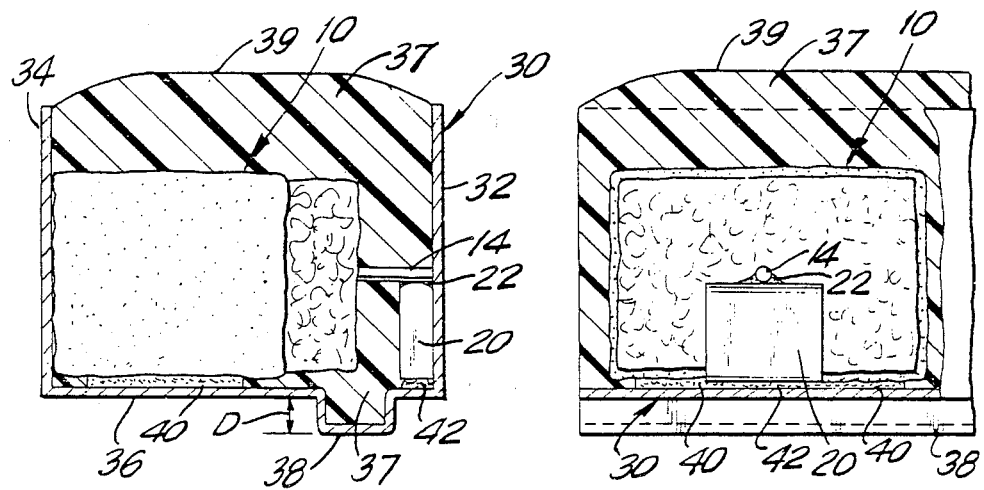
Figure 6A:
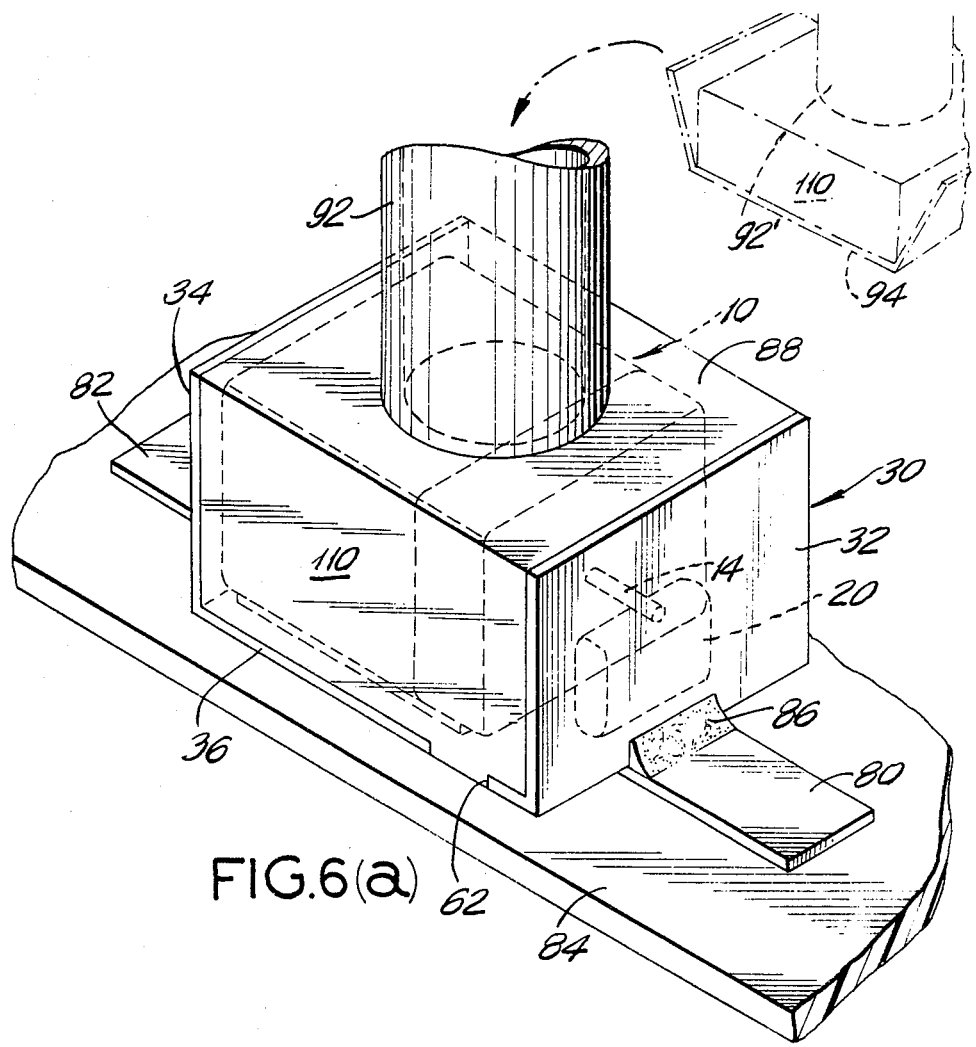
Figure 6B:
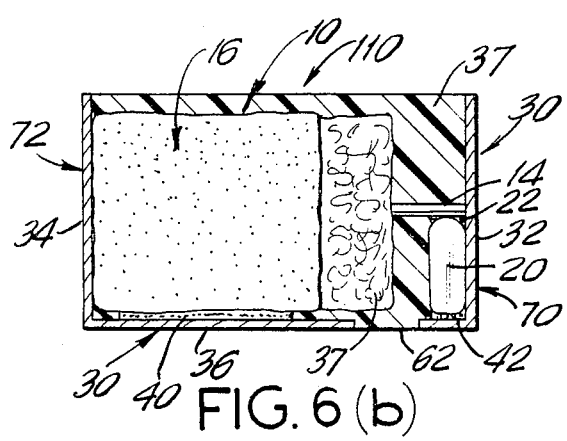
Figure 6C:
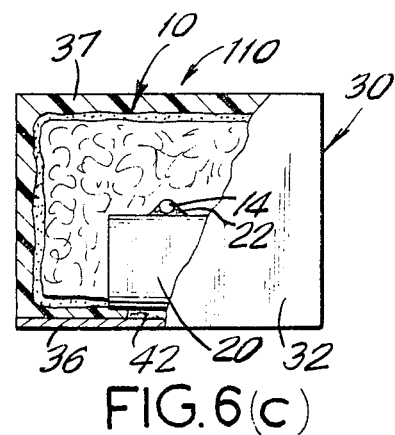

Other objects will be apparent from the following description and claims taken inconjunction with the drawing wherein:

FIGS. 1(a) and 1(b) show a solid electrolyte tantalum capacitor;

FIGS. 2(a) and 2(b) show a partially assembled chip capacitor;

FIG. 3 shows a channel arrangement used in the manufacture of encapsulated chip capacitors in accordance with the present invention;

FIGS. 4(a) and 4(b) show side and front views of the channel arrangement of FIG. 3;

FIGS. 5(a) and 5(b) show the arrangement of FIGS. 4(a) and 4(b) at a further step of processing; and FIGS. 6(a), 6(b) and 6(c) show the finished encapsulated chip capacitor of the present invention; and With reference to FIGS. 1(a) and (b), an electrolytic tantalum capacitor is shown at 10 formed of a porous sintered tantalum anode body 12 from which extends a tantalum anode lead wire 14. A cathode metallization 16, e.g. of copper, silver alloy or solder, covers a substantial portion of the surface of sides 17, top 18, and bottom 19, of anode body 12 to provide a cathode connection for capacitor 10. The capacitor 10 is preferably of rectangular (vertical and longitudinal) cross-section to maximize volumetric efficiency. Following the practice of the present invention and with reference to FIGS. 2(a) and (b), capacitor 10 is provided with an anode connecting element 20 preferably formed of a weldable and solderable metal, e.g., copper, nickel, or iron-nickel alloys, and can be formed, for example, by flattening a short length of wire. Connecting element 20 is welded at 22 to the end portion of tantalum anode lead wire 14 and preferably, for subsequent mounting effectiveness, element 20 extends downward to terminate at a common level with the bottom of capacitor 10.

A puddle of solder paste 24 is applied to the bottom of connecting element 20 and a larger puddle of solder paste 26 is similarly applied to cathode metallization 10. Alternately, the solder paste can be applied directly to the channel 30 at corresponding locations. The resulting subassembly 100 is placed in a thin (e.g. 3 to 10 mil) metal channel 30, suitably copper, a copper base alloy, such as brass, or other solderable metal, together with a plurality of other spaced apart subassemblies indicated at 100′. The channel 30, which can be readily manufactured to precise dimensions and the readily performed subsequent machining operations e.g. grinding, sawing, are important aspects in enabling precise dimensional control of the resulting chip capacitors. The end of anode lead wire 14 of each capacitor 10 is closely adjacent to a side wall 32 of metal channel 30 while the rear surface 21 of each capacitor 10 is closely adjacent to the opposite parallel channel side wall 34. The capacitor body subassemblies 100, 100′, etc. rest on the bottom member 36 of channel 30 at this stage of the processing as shown more clearly in FIGS. 4(a) and (b). Solder paste puddles 24, 26 are now melted, e.g., by resistance, induction, or thermal transfer heating, and an electrical solder bond connection 40 is provided between cathode metallization 16, and the closely adjacent portion of channel bottom member 36 as shown in FIGS. 5(a) and (b); similarly an electrical solder bond 42 is provided between connecting element 20 and the closely adjacent portion of channel 30.

After the above noted axially-spaced electrical connections are provided for each subassembly 100,100′ etc., the channel 30 is filled with encapsulant 37, as indicated in FIGS. 5(a), (b), e.g., silicone, by techniques such as potting, by dispensing silicone liquid into the channel, followed by vacuum deairing and heating to cure the resin. In a preferred processing embodiment illustrated, the encapsulant fills the interstices in channel 30, including sub-channel or trough 38, which has a depth "D" greater than the thickness of channel bottom member 36, as shown in FIGS. 3 and 5(a) and 5(b). When the encapsulant has sufficiently cured, the solidified encapsulant meniscus indicated at 39 in FIG. 5(a), (b) is machined down to a common level with the heights of channel side walls 32, 34 and the trough 38 and encapsulant contained therein is removed, e.g. by grinding, and the channel 30 is sliced, e.g., by diamond sawing at locations 31 indicated in FIG. 3 to provide individual capacitor assemblies 110 such as illustrated in FIGS. 6(a), (b) and (c). The external surface of the channel can at this point be plated with solder, if desired, to enhance the solderability of the terminals of the finished chip capacitor.

As can be seen from FIGS. 6(a), (b) and (c), the removal of sub-channel or trough 38 establishes a slot 62 in channel 30, which is bridged by encapsulant 37, and which divides channel 30 of assembly 100 into an anode terminal 70, and a cathode terminal 72, which are electrically isolated from one another. Other methods, such as sawing a groove in the channel 30, can also be used to electrically separate the anode and cathode portions of the channel.

The thus provided encapsulated chip capacitor assembly 110 has a combination of substantial advantages, e.g., precise dimensional control, high volumetric efficiency of capacitance, planar surfaces adapted for automated handling and assembly operations and efficient electrical connection to circuit boards, mounting versatility and adaptability for automated production.

With reference to FIG. 6(a), it can be seen that the encapsulated chip capacitor made in accordance with the present invention, when mounted on metal lands 80, 82 of a circuit board 84, enables the formation of an extended and readily inspected solder connection 86 at the anode terminal and a comparable solder connection can be made at the cathode terminal. The encapsulated chip capacitor can also be inverted and the same type of solder connection to lands 80 can be achieved.

Also, the completely planar, upper epoxy surface 88 of the encapsulated chip capacitor assembly 100 of the present invention enables the efficient transport of the same by commonly used commercial devices such as the conventional vacuum probe "pick up" indicated at 92 in FIG. 6(a) which is not able to accomplish a transfer from a precisely defined location such as a pocket in a continuous tape or other automatic dispensary system indicated at 94 unless contact can be made with a flat surface; the presence of even a relatively slight discontinuity from a planar surface would interfere with the operation of the vacuum pick up or sensor.

What is claimed is:

1. An article adapted to be sliced and machined to provide encapsulated chip capacitors.
   (i) comprising an elongated U-shaped metal channel having parallel first and second side members and bottom member, said bottom member having therein a trough parallel to said side members and spaced therefrom,
   (ii) a plurality of spaced-apart electrolytic tantalum capacitors arranged within said channel, each said capacitor including:
      (a) a tantalum body of generally rectangular cross-section having front, rear, bottom, top and side surfaces with portions of said bottom and side surfaces being provided with a cathode metallization and,
      (b) an axial tantalum lead wire extending from said front surface, each said capacitor being positioned within said channel such that (i) the axial tantalum anode lead wire thereof is substantially perpendicular to and extends toward the first side member of said channel with the end of said extended wire being closely adjacent to said first side member, (ii) the rear surface thereof is closely adjacent to the second side member of said channel, (iii) the bottom surface thereof is closely adjacent to the bottom member of said channel,
   (iii) a plurality of separate first electrical connections between a portion of the cathode metallization of each said capacitor and an adjacently opposite portion of said channel on one side of said trough,
   (iv) a plurality of separate second electrical connections between the tantalum anode lead wire of each said capacitor and said channel at a portion of said channel adjacent to said anode lead wire on the opposite side of said trough, and
   (v) encapsulant insulating material surrounding each capacitor and said plurality of first and second electrical connections and filling the volume defined by said channel including the trough of said channel.

2. An article in accordance with claim 1 wherein said trough is coextensive with said channel.

3. An article in accordance with claim 1 wherein said trough has a depth which is greater than the thickness of said bottom member.

4. An article in accordance with claim 1 wherein said trough is oppositely below the front surface of each of said plurality of capacitors.

* * * * *